United States Patent
Pearce

(10) Patent No.: US 8,447,026 B2
(45) Date of Patent: *May 21, 2013

(54) DATA DRIVEN CONFIGURATION OF CALL MANAGEMENT APPLICATIONS

(75) Inventor: Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,549

(22) Filed: Dec. 13, 2011

(65) Prior Publication Data

US 2012/0082154 A1  Apr. 5, 2012

Related U.S. Application Data

(63) Continuation of application No. 12/330,135, filed on Dec. 8, 2008, now Pat. No. 8,085,925, and a continuation of application No. 09/867,918, filed on May 29, 2001, now Pat. No. 7,463,729.

(51) Int. Cl.
*H04M 3/00* (2006.01)
*H04M 7/00* (2006.01)

(52) U.S. Cl.
USPC .................. 379/242; 379/221.01

(58) Field of Classification Search .......... 379/242, 379/221.01, 201.12; 370/352, 238
See application file for complete search history.

(56) References Cited

U.S. PATENT DOCUMENTS

| | | | |
|---|---|---|---|
| 5,343,517 A | 8/1994 | Bogart et al. | 379/219 |
| 6,697,475 B1 | 2/2004 | MeLampy et al. | 379/201.12 |
| 6,704,406 B1 | 3/2004 | Pearce et al. | 379/221.01 |
| 6,975,718 B1 | 12/2005 | Pearce et al. | 379/221.01 |
| 7,113,500 B1 | 9/2006 | Bollinger et al. | 370/352 |
| 7,542,427 B2 * | 6/2009 | Bollinger et al. | 370/238 |
| 2002/0122547 A1 | 9/2002 | Hinchey et al. | 379/221.01 |
| 2004/0133888 A1 | 7/2004 | Ard et al. | 717/174 |
| 2006/0002380 A1 | 1/2006 | Bollinger et al. | 370/352 |
| 2006/0168326 A1 | 7/2006 | Baldwin et al. | 709/238 |

* cited by examiner

*Primary Examiner* — Thjuan K Addy
(74) *Attorney, Agent, or Firm* — Baker Botts L.L.P.

(57) ABSTRACT

A call manager uses a call management application in conjunction with a live dial database to control routing of calls for managed devices. To generate the live dial database, the call management application accesses configured route patterns and enters these patterns into the live dial database. Upon identifying an expansion indicator in a configured route pattern, the call management application accesses dial plan data that includes multiple route pattern definitions that each define a pattern using one or more sub-strings and, for each sub-string, an associated tag. The call management application then enters patterns defined by the route pattern definitions into the live dial database based on various other criteria established for the configured route pattern having the expansion indicator.

21 Claims, 3 Drawing Sheets

| | NUMBERING PLAN |
|---|---|
| 1 | NANP |
| 2 | |
| 3 | |
| 4 | |

| | TAG |
|---|---|
| 1 | ACCESS-CODE |
| 2 | INTERNATIONAL-ACCESS |
| 3 | COUNTRY-CODE |
| 4 | NATIONAL-NUMBER |
| 5 | TRANSIT-NETWORK-ESCAPE |
| 6 | TRANSIT-NETWORK |
| 7 | LONG-DISTANCE-DIRECT-DIAL |
| 8 | AREA-CODE |
| 9 | OFFICE-CODE |
| 10 | SUBSCRIBER |

| | DIGIT DISCARD INSTRUCTIONS | NUMBERING PLAN |
|---|---|---|
| 1 | 10d-7d | 1 |
| 2 | PREDOT | 1 |
| 3 | 1010 | 1 |
| 4 | ⋮ | ⋮ |
| 5 | | |

| | DDI NUMBER | TAG NUMBER | |
|---|---|---|---|
| | | MAINTAIN | DISCARD |
| 1 | 1 | 9 | |
| 2 | 1 | 10 | |
| 3 | 2 | | 1 |
| 4 | 3 | | 5 |
| 5 | 3 | | 6 |
| ⋮ | ⋮ | | |

DATA DRIVEN CONFIGURATION OF CALL MANAGEMENT APPLICATIONS

CROSS-REFERENCE TO RELATED APPLICATION

This application is a continuation of U.S. application Ser. No. 12/330,135 filed Dec. 8, 2008 and entitled "Data Driven Configuration of Call Management Applications" which is a continuation of U.S. application Ser. No. 09/867,918 filed May 29, 2001 and entitled "Data Driven Configuration of Call Management Applications" now U.S. Pat. No. 7,463,729.

TECHNICAL FIELD OF THE INVENTION

The present invention relates generally to call management and, more particularly, to data driven configuration of call management applications.

BACKGROUND OF THE INVENTION

With the growing complexity of telecommunications systems, management and configuration of call control equipment has become increasingly more complicated. For example, with the expansion of Internet protocol (IP) voice communications, call control equipment must often control telephony communications over and between multiple different communication networks. Moreover, because telecommunication protocols are driven by regional requirements, such as the North American Numbering Plan (NANP), call control equipment and applications are often limited in their portability.

SUMMARY OF THE INVENTION

In accordance with the present invention, techniques for data driven configuration of call management applications are provided which substantially eliminate or reduce disadvantages and problems associated with previous techniques. In a particular embodiment, the present invention satisfies a need for a call management application that initializes and provides call management by accessing a separate, configurable set of dial plan data.

According to one embodiment of the present invention, a method for telephony call management maintains dial plan data defining multiple route patterns. These route pattern definitions each include one or more sub-strings, with each sub-string having an associated tag. The method also maintains configured routing data that includes at least one configured route pattern that has an expansion indicator. The method accesses the configured routing data to read the configured route pattern, identifies the expansion indicator in the configured route pattern, and accesses the dial plan data responsive to identifying the expansion indicator. For each of the route pattern definitions in the dial plan data, the method generates a route pattern based on the route pattern definition and enters the generated route pattern into a live dial database for use in routing calls placed by users.

Embodiments of the present invention provide numerous technical advantages. Using a telephony call management application having a separate, configurable dial plan allows an administrator to install and use the application in any suitable geographic region, simply by obtaining and/or generating an appropriate set of dial plan data. Moreover, separation of the dial plan data from the call management application permits modifications to the dial plan data in case of changing regional requirements and permits customization of dial plans based upon specific customer requirements. In addition, particular embodiments maintain the dial plan data as a relatively easy to modify file, such as an ASCII text file.

Other technical advantages of the present invention will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figures 1, 3A, 3B, 3C, 3D:
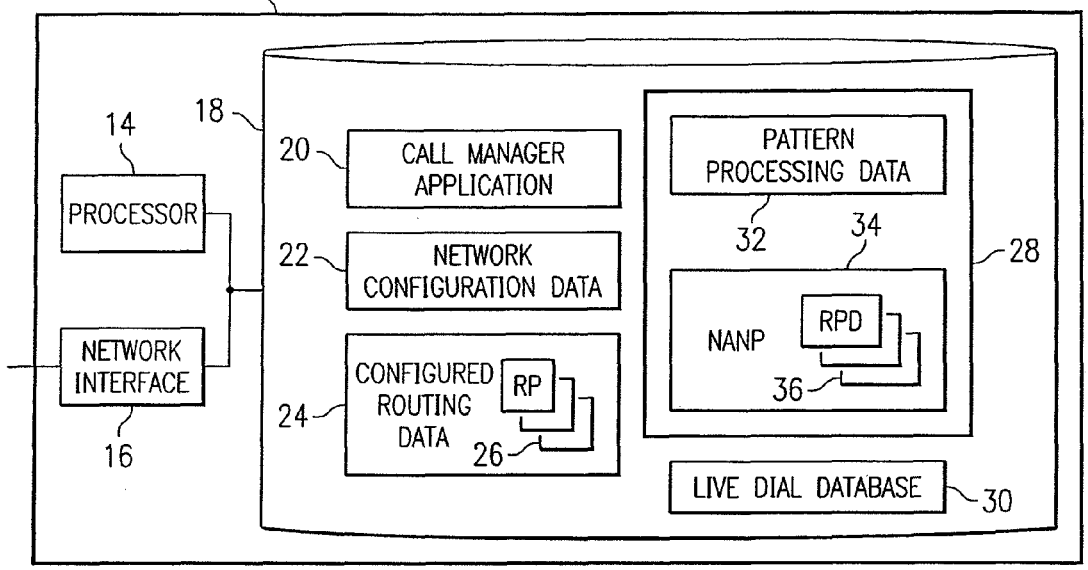
FIG. 1 illustrates exemplary components of a call manager having a call management application and configurable dial plan data for use by the call management application.
FIGS. 3a, 3b, 3c and 3d are tables illustrating selected dial plan data for use by a call management application during initialization.

FIG. 1 illustrates a call manager 12 that includes a processor 14, a network interface 16, and a memory 18. Within memory 18, call manager 12 maintains a call manager application 20, network configuration data 22, and configured routing data 24, which includes one or more route patterns 26. Within memory 18, call manager 12 also maintains dial plan data 28 and a live dial database 30. In general, call manager 12, using call manager application 20, manages telephony communications for one or more managed devices. This includes the routing of calls from these devices using information maintained in live dial database 30. To generate live dial database 30, call manager application 20 accesses route patterns 26 to identify routing configurations specified by an administrator. Call manager application 20 may detect an expansion indicator in one or more of these configured route patterns 26 and, in response, expands on the patterns to include information from dial plan data 28 in live dial database 30. Thus expansion indicators serve as "wildcards" in a route pattern that, when detected, indicate for call manager application 20 to expand using information from dial plan data 28.

Call manager 12 represents any suitable collection and arrangement of components at one or more locations that operate to manage and control telephony communications for devices within one or more tenants. Thus, processor 14 represents one or more microprocessors, controllers, logic devices and/or other suitable equipment for executing software, logic or other control applications such as call manager application 20. Network interface 16 represents hardware and any associated controlling logic for linking components of call manager 12 and for coupling call manager 12 to other devices and communication networks. For example, network interface 16 may couple to an Internet Protocol (IP) network that links managed IP telephony devices of a tenant.

Memory 18 represents any suitable collection and arrangement of volatile or non-volatile, local or remote data storage devices. In the embodiment illustrated, memory 18 stores call manager application 20, network configuration data 22, configured routing data 24, dial plan data 28, and live dial database 30. Call manager application 20 represents logic, such as computer software, for controlling the operation of call manager 12, including the management of telephony communications for managed devices. Network configuration data 22 represents information describing coupled networks, network configurations, managed devices, and other appropriate network information for controlling the routing and management of telephony communications. For example, network configuration data 22 may include an IP address of call manager 12 and information identifying various available gateways for routing packet-based telephone calls placed from managed devices to equipment coupled to the public switched telephone network (PSTN).

Configured routing data 24 includes route patterns 26 that have been set by an administrator and/or other device to specify the routing of telephone calls from managed devices. For example, a selected route pattern 26 may specify a pattern to match against dialed digits received from a managed device and an indication of a device or devices to route the call to upon matching the dialed digits to the specified pattern. For example, a selected route pattern 26 may specify a pattern that matches telephone numbers having an area code in Dallas and a gateway in Dallas for routing matching telephone calls into the PSTN. Thus, for a call matching the pattern, call manager 12 may route the call across an IP network to the specified gateway, with the gateway then transitioning the call into the PSTN. In addition, because call manager 12 may route telephone calls among various devices having different protocols and/or different network addressing plans, route patterns 26 may also specify transformations to the digits identifying the calling party as well as the digits identifying the called party. For example, to map numbers from the PSTN to a private network, call manager 12 may transform a ten-digit number into a four-digit number expected by the private network.

Dial plan data 28 specifies information for transforming, processing, and/or expanding on route patterns 26 as call manager application 20 generates live dial database 30. In the example illustrated, dial plan data 28 includes pattern processing data 32 and a numbering plan 34 that specifies a number of route pattern definitions 36. Pattern processing data 32 includes information for combination with route patterns 26 by call manager application 20 in order to generate entries for live dial database 30. For example, pattern processing data 32 may specify available numbering plans 34, tags available for these numbering plans, and dialing transformations keyed off of these available tags. Thus, pattern processing data 32 specifies options for processing selected route patterns 26 when generating entries in live dial database 30.

For example, pattern processing data 32 may specify "INTERNATIONAL-ACCESS" as one of the available tags and a route filter that prevents any pattern from entering live dial database 30 if the pattern has a sub-string with a tag matching INTERNATIONAL-ACCESS. In addition, these tags may be used to transform numbers matching to patterns. For example, "AREA-CODE" may be specified as a tag, and pattern processing data 32 may define a dialing transformation that alters dialed digits matching a selected route pattern 26 by keeping or discarding the area code of the dialed number.

Dial plan data 28 also includes one or more numbering plans 34 that define the route patterns for particular regions or define customized numbering plans. In the example illustrated, numbering plan 34 contains route pattern definitions 36 to define route patterns for the North American Numbering Plan (NANP). Each route pattern definition 36 defines a string for a route pattern using one or more sub-strings and associated tags for some or all of the sub-strings. These associated tags match to and/or define the tags available in pattern processing data 32 for processing route patterns 26. According to a particular embodiment, call manager 12 implements numbering plan 34 as a text file having a series of entries such as the following:

```
# P:            Digit pattern -- PATTERN TAG
# T:            Type of Number -- I(nternational) or N(ational)
# W:            Network Specific Facilities -- OP or OP/P or OPXXX
                or OPXXXX
# U:            Urgent pattern? (Call extended immediately on match)
# 0
P: 0            LOCAL-OPERATOR
T: N
W: OP
# 00
P: 00           LONG-DISTANCE-OPERATOR
T: N
W: OP/P
# [2-9]11
P: [2-9]11      SERVICE
T: N
U: Y
# 0+[2-9][02-9]XXXXX
P: 0            LOCAL-OPERATOR
P: [2-9][02-9]X OFFICE-CODE
P: XXXX         SUBSCRIBER
T: N
W: OP
# 0+[2-9]X[02-9]XXXX
P: 0            LOCAL-OPERATOR
P: [2-9]X[02-9] OFFICE-CODE
P: XXXX         SUBSCRIBER
T: N
W: OP
# 0+[2-9][02-9]X[2-9]XXXXXX
P: 0            LONG-DISTANCE-OPERATOR
P: [2-9][02-9]X AREA-CODE
P: [2-9]XX      OFFICE-CODE
P: XXXX         SUBSCRIBER
T: N
W: OP
# 0+[2-9]X[02-9][2-9]XXXXXX
P: 0            LONG-DISTANCE-OPERATOR
P: [2-9]X[02-9] AREA-CODE
P: [2-9]XX      OFFICE-CODE
P: XXXX         SUBSCRIBER
T: N
W: OP
# 1+[2-9][02-9]X[2-9]XXXXXX
P: 1            LONG-DISTANCE-DIRECT-DIAL
P: [2-9][02-9]X AREA-CODE
P: [2-9]XX      OFFICE-CODE
P: XXXX         SUBSCRIBER
T: N
```

The preceding route pattern definitions illustrate a particular method for defining patterns for numbering plans 34. As illustrated by this selected portion of the North American Numbering Plan, each pattern definition defines a particular pattern for potentially comparing with digits dialed by a device managed by call manager 12. Thus, to fully implement a selected numbering plan, a file and/or other data structure may potentially have tens or hundreds of route pattern definitions 36.

In the embodiment illustrated in the preceding text, the route pattern definition each use one or more text lines to identify sub-strings of a routing pattern as well as a tag associated with that sub-string. For example, the first route pattern definition in the preceding text provides routing for a device dialing the digit zero to reach an operator. The first line of this definition, which begins with the pound sign (#), serves as a comment describing the string to match and does not affect the actual route pattern definition. Each subsequent line beginning with a "P" defines a sub-string and a tag associated with the sub-string. However, to reach an operator, only a single sub-string for matching to the digit zero and having the associated tag for "LOCAL-OPERATOR" is defined. Within each of the pattern definitions, tags identify the defined sub-strings of a pattern. Because these definitions associate various portions of defined patterns with tags, call manager 12 and administrators may relatively easily handle and manipulate these defined routing patterns.

Moreover, as shown by the preceding text, numbering plan 34 can maintain some or all of the available and/or defined routing patterns for a particular region in a relatively easy to access and modify format. However, while the preceding text illustrates a particular embodiment for defining a selected numbering plan 34 as a series of text route pattern definitions, call manager 12 contemplates using any suitable configurable data format for providing route pattern definitions 36 for numbering plans 34.

Numbering plan 34 provides an easy to use and configure data source for defining available routing patterns for call manager 12. To enter some or all of the routing patterns defined by numbering plan 34 into live dial database 30, an administrator need only specify a single route pattern 26 that includes an expansion indicator. Then, at initialization, call manager application 20 identifies the expansion indicator in route pattern 26 and, in response, accesses numbering plan 34 to potentially add routing patterns into live dial database 30 for each route pattern definition 36. Thus, using route patterns 26 and dial plan data 28 when appropriate, call manager application 20 populates live dial database 30 with routing patterns for routing telephone calls from managed devices.

While the embodiment illustrated includes specific data sets maintained as various separate blocks, call manager 12 contemplates any suitable separation and/or combination of various routing data, so long as call manager 12 provides a configurable set of definitions for routing patterns, with this set of definitions available for entry into live dial database 30 based upon a single configured route pattern. Thus, call manager 12 may maintain pattern processing data 32 and numbering plans 34 in any suitable format, such as tables in a database and/or one or more text files.

Figure 2:
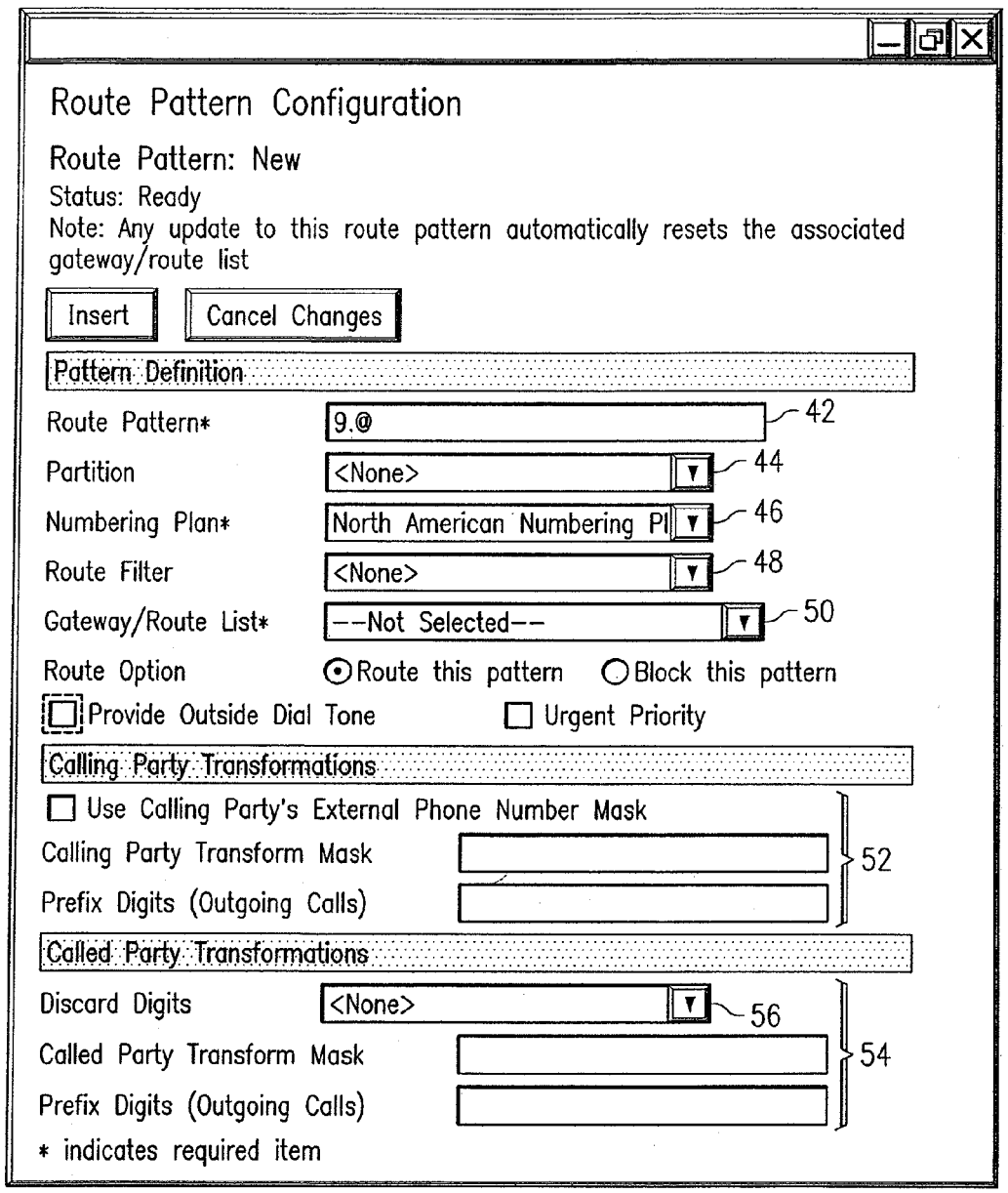
FIG. 2 illustrates an interface for configuring a route pattern having an expansion indicator for triggering the call management application to access a configurable dial plan data file.

FIG. 2 illustrates an interface for receiving information for generating a selected route pattern 26 in configured routing data 24. In the example illustrated, interface 40 includes a route pattern field 42, a partition field 44, a numbering plan field 46, a route filter field 48, and a gateway/route list field 50. Interface 40 also includes fields for specifying dialing transformations such as calling party transformations 52 and called party transformations 54. Using route pattern field 42, an administrator may specify a pattern for entry into live dial database 30 and, using gateway/route list field 50, may specify a particular device or devices to which to potentially route dialed digits matching the pattern entered in route pattern field 42. Moreover, by including an expansion indicator within route pattern field 42, an administrator may indicate an intent to include all route patterns defined for the numbering plan identified in numbering plan field 46.

In the example illustrated, the pattern in route pattern field 42 is "9.@" with the @ serving as an expansion indicator. Moreover, numbering plan field 46 indicates for call manager application 20 to access the North American Numbering Plan to expand the pattern. Thus, the specified pattern in route pattern plan 42 will potentially result in the addition of routing patterns into live dial database 30 for dialed numbers beginning with a number 9 and followed by any set of valid digits for a North American telephone number. Thus, any valid North American number, when proceeded by the digit 9, may be routed to the gateway and/or other devices specified by gateway/route list field 50.

To limit the various patterns from the North American Numbering Plan entered into live dial database 30 by call manager application 20, interface 40 provides route filter field 48. Using route filter field 48, an administrator may indicate selected patterns or types of patterns to exclude from live dial database 30, despite these patterns being defined in numbering plan 34 for the North American Numbering Plan. According to a particular embodiment, the route filters available for selection and/or specified by an administrator in route filter field 48 identify patterns from the North American Numbering Plan to discard and/or keep using the tags associated with the patterns. For example, a selected route filter may permit the entry of only patterns not having an "INTERNATIONAL-ACCESS" tag defined for the pattern. Thus, while the North American Numbering Plan may include valid patterns for calling international numbers that include the INTERNATIONAL-ACCESS Tag, call manager application 20 will filter out these patterns when generating live dial database 30. Since calls only precede upon matching a pattern in live dial database 30, the route filter described prevents users from placing international calls unless permitted by another one of configured route patterns 26. Therefore, the association of tags with sub-strings within patterns allows for a relatively simple manipulation of patterns to be added or excluded from live dial database 30.

Interface 40 also permits an administrator to specify dialing transformations to the dialed digits and/or the digits identifying the calling party. As with the route filters, these dialing transformations may specify manipulations of called and/or calling party digits based upon tags defined in route pattern definitions 36. For example, using a digit discard field 56, an administrator may specify specific sub-strings of called party digits to keep and/or discard using tags defined by route pattern definitions 36. Thus, a particular digit discard instruction may specify, for example, the particular sub-strings from a dialed number to maintain when converting any eleven-digit or ten-digit number to a seven-digit number. For this conversion, the digit discard instruction may specify to keep the sub-strings identified by the tags "OFFICE-CODE" and "SUBSCRIBER." When applied, this digit discard instruction results in call manager application 20 transforming any dialed digits matching the specified pattern into a seven-digit number. However, while this example illustrates a specific operation defined for discarding digits, call manager 12 contemplates providing any appropriate dialing transformations for operation upon called and/or calling party digits based upon tags defined in route pattern definitions 36.

Moreover, while interface 40 illustrates a particular embodiment for an administrator to configure route patterns 26, call manager 12 contemplates presenting any suitable interface having fields appropriate for specifying a routing pattern, with the option of specifying a routing pattern for expansion into some or all of the valid routing patterns for a particular numbering plan.

FIGS. 3a, 3b, 3c and 3d illustrate selected portions of pattern processing data 32 maintained as four tables. These include a numbering plan table 60, a tag table 64, a digit discard instructions (DDI) table 68, and a DDI member table 72.

Numbering plan table 60 identifies various numbering plans 34 available, which in this example, includes the North American Numbering Plan (NANP). However, numbering plan table 60 may include a listing of one or more available numbering plans and may include customized numbering plans, such as a customization of the North American Numbering Plan. According to a particular embodiment, call manager application 20 accesses numbering plan table 60 to provide options for administrators configuring routing data. For example, during configuration of a selected route pattern 26, interface 40, using numbering plan field 46, may present the various numbering plans 34 listed in numbering plan table 60.

Tag table 64 provides a listing of tags associated with various portions of telephone numbers. For example, for the telephone number (214) 555-1234, the tag "AREA-CODE" identifies 214, the tag "OFFICE-CODE" identifies 555, and the tag "SUBSCRIBER" identifies 1234. Thus, using these tags, call manager 12 may identify, modify, and operate on dialed digits and route patterns. The tags listed in tag table 64 may be permanently configured, configurable by an administrator, and/or automatically generated based on tags in numbering plans 34. For example, call manager application 20 or other suitable applications may access numbering plans 34 to determine all available tags and populate tag table 64 with these tags.

DDI table 68 identifies predefined dialing transformations for application to dialed digits. In this example, predefined digit discard instructions for numbering plan number 1 (NANP) provide ten-digit to seven-digit transformation, discarding of digits preceding a "period" in a route pattern, and for discarding digits that attempt to select a particular long-distance carrier. According to a particular embodiment, interface 40 presents the digit discard instructions in digit discard instructions field 56 based upon the instructions listed for numbering plan 34 selected in numbering plan field 46. For example, if an administrator selects the NANP, call manager application 20 may identify all available digit discard instructions for this numbering plan and present those instructions as options in DDI field 56. This provides an administrator with pre-configured options for selecting dialing transformations with these digit discard instructions.

DDI member table 72 details operations for discarding or maintaining portions of dialed digits based on tags for the digit discard instructions listed in DDI table 68. In the example illustrated, DDI member table 72 provides instructions for achieving the three first instructions listed in DDI table 68. For the first digit discard instruction, DDI member table 72 provides instructions for obtaining a seven digit number having the appropriate digits from a dialed number. Thus, DDI member table 72 indicates to maintain tags nine and ten (OFFICE-CODE and SUBSCRIBER). Similarly, for the third digit discard instruction, 1010 (equal access suppression), DDI member table 72 indicates to discard tags five and six (TRANSIT-NETWORK-ESCAPE and TRANSIT-NETWORK), which prevents a caller from selecting an alternate long distance carrier.

While the preceding tables illustrate specific information maintained using a particular format, call manager 12 contemplates maintaining pattern processing data 32 using any appropriate data storage techniques and arrangements. Thus, while these examples illustrate a particular embodiment for providing pattern processing data 32 that specifies manipulations of digits based upon tags associated with sub-strings of matching route patterns, call manager 12 may maintain and/or access this information in any suitable format, and this pattern processing data 32 may be incorporated within other data, such as within individual numbering plans 34 and route pattern definitions 36.

Figure 4:
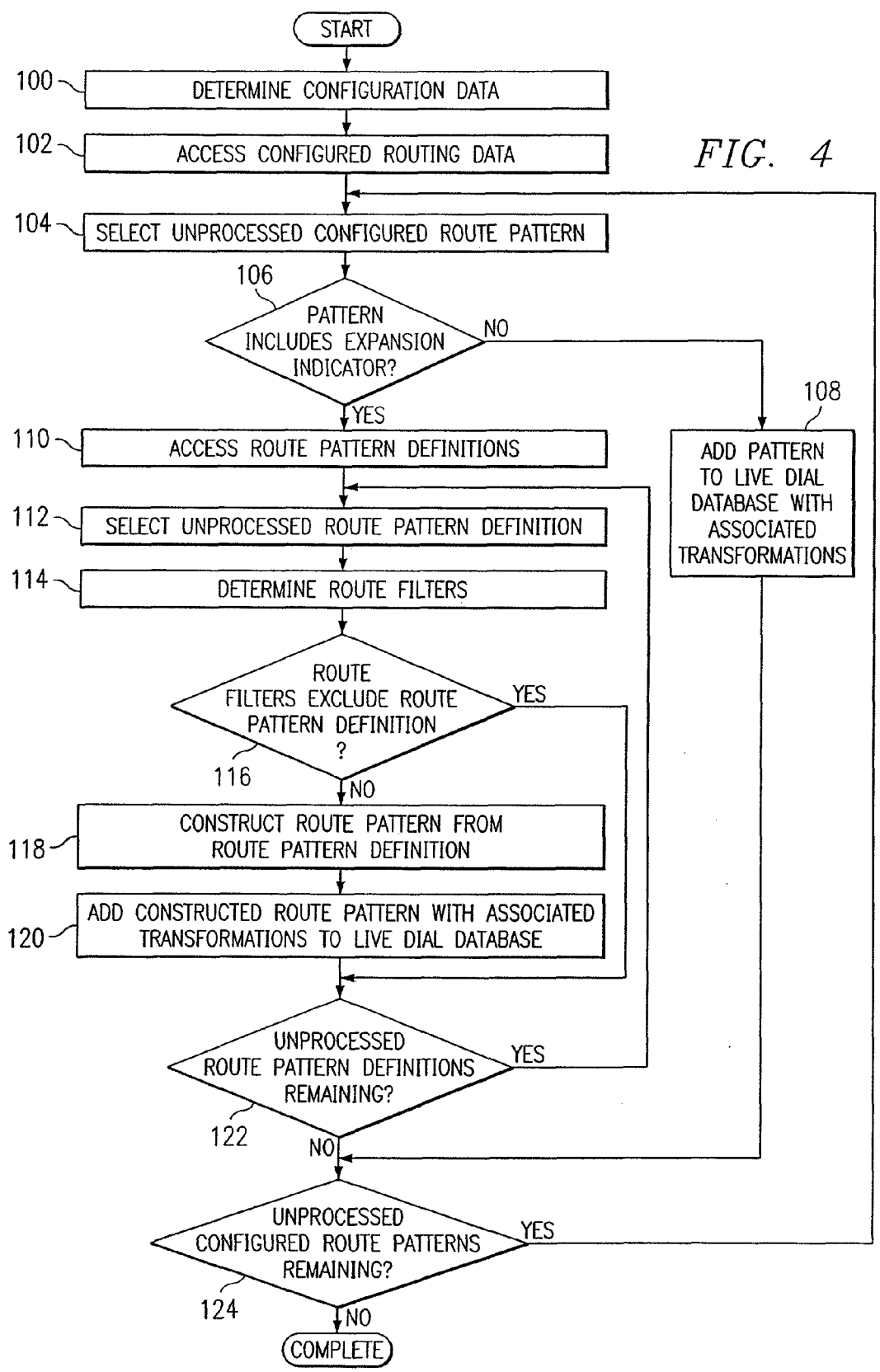
FIG. 4 is a flowchart illustrating a method for initializing a call management application based upon configurable dial plan data that includes a number of route pattern definitions.

FIG. 4 is a flowchart illustrating a method for call manager 12, upon executing call manager application 20, to populate live dial database 30 based upon configured routing data 24 and dial plan data 28. Call manager 12 accesses network configuration data 22 to determine an appropriate configuration, such as an Internet Protocol (IP) address for call manager 12, and other suitable information at step 100. Call manager 12 accesses configured routing data 24 at step 102 and selects an unprocessed route pattern 26 at step 104. Call manager 12 determines whether the pattern includes an expansion indicator, such as the @ sign, at step 106, and if not, adds the patterns to live dial database 30 with any associated transformations at step 108. For example, for a route pattern configured using interface 40 that does not include an expansion indicator, call manager 12 enters the route pattern into live dial database 30 along with an indication that numbers matching that route pattern are to be routed to the gateway and/or route list specified in gateway/route list field 50. Moreover, live dial database 30 may also reflect any dialing transformations specified in interface 40 for this route pattern.

If route pattern 26 includes an expansion indicator, call manager 12 accesses route pattern definitions 36 at step 110 and selects an unprocessed route pattern definition 36 at step 112. Based upon route filters determined at step 114, call manager 12 determines whether these route filters exclude the pattern defined by route pattern definition 36 at step 116. For example, the selected route pattern definition 36 may define a route pattern having an INTERNATIONAL-ACCESS tag and the route filters specified may exclude any route patterns having this tag. If excluded by the route filters, call manager 12 does not include the pattern defined by route pattern definition 36 in live dial database 30. However, if not excluded by the route filters, call manager 12 constructs a route pattern from the route pattern definition at step 118 and adds the constructed route pattern with associated dialing transformations to live dial database 30 at step 120. Call manager 12 determines whether unprocessed route pattern definitions 36 remain at step 122. If so, call manager 12 proceeds through route pattern definitions 36 in numbering plan 34 and adds each of these route pattern definitions 36 into live dial database 30 unless excluded by route filters.

Thus, by including an expansion indicator in a configured route pattern 26, an administrator may include some or all of the route patterns defined for numbering plan 34 based upon selected route filters. After processing all route pattern definitions 36 in numbering plan 34, call manager 12 determines whether unprocessed configured route patterns 26 remain at step 124. If so, call manager 12 again determines whether the selected route pattern 26 includes an expansion indicator and adds appropriate entries into live dial database 30 based upon route pattern 26. After processing route patterns 26, this stage of initialization of live dial database 30 is complete.

While this flowchart illustrates an exemplary method of operation, call manager 12 may use any suitable techniques for accessing configured routing patterns and when necessary, expanding these routing patterns using a set of route pattern definitions defining patterns as sub-strings with associated tags. Thus, many of the steps in this flowchart may take place simultaneously and/or in different orders than as shown. In addition, call manager 12 may use methods with additional steps, fewer steps and/or different steps, so long as the methods remain appropriate. Thus, the example provided by this flowchart is merely illustrative, and call manager 12 contemplates using any suitable steps for initializing a live dial database 30 based upon configurable dial plan data.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A telephony call management apparatus comprising:
a memory storing:
a call management application;
a live dial database;
configured routing data comprising at least one configured route pattern that includes an expansion indicator; and
dial plan data comprising a plurality of route pattern definitions; and
a processor operable, when executing the call management application:
to access each route pattern in the configured routing data;
to identify the expansion indicator; and
responsive to identifying the expansion indicator:
to access the dial plan data; and
for each of the route pattern definitions in the dial plan data:
to generate a route pattern based on the route pattern definition; and
to enter the generated route pattern into the live dial database.

2. The apparatus of claim 1, wherein:
the dial plan data implements the North American Numbering Plan; and
the live dial database specifies routing of telephone calls from managed voice over Internet protocol (VoIP) devices.

3. The apparatus of claim 1, wherein:
the configured routing data further comprise a route filter; and
the processor is further operable, for each of the route pattern definitions in the dial plan data, to generate the route pattern and to enter the generated route pattern into the live dial database based on the route filter.

4. The apparatus of claim 3, wherein the route filter specifies valid route patterns using tags associated with each route pattern.

5. The apparatus of claim 1, wherein the configured routing data further comprise digit discard instructions, the digit discard instructions specifying digits to retain when routing calls placed by users, the digits specified using tags associated with the configured route pattern.

6. The apparatus of claim 1, wherein the configured routing data further comprise digit transformation instructions, the digit transformation instructions specifying a modification to perform on matched digits, the matched digits and the modification to perform specified tags associated with the configured route pattern.

7. A method for telephony call management comprising:
maintaining dial plan data comprising a plurality of route pattern definitions;
maintaining configured routing data comprising a configured route pattern including an expansion indicator;
accessing the configured routing data to read the configured route pattern;
identifying the expansion indicator in the configured route pattern;
accessing the dial plan data responsive to identifying the expansion indicator; and
while accessing the dial plan data, for each of the route pattern definitions in the dial plan data:
generating a route pattern based on the one or more sub-strings for the route pattern definition; and
entering the generated route pattern into a live dial database for use in routing calls placed by users.

8. The method of claim 7, wherein:
the dial plan data implements the North American Numbering Plan; and
the live dial database specifies routing of telephone calls from managed voice over Internet protocol (VoIP) devices.

9. The method of claim 7, wherein:
the configured routing data further comprise a route filter; and
the method further comprises, for each of the route pattern definitions in the dial plan data, generating the route pattern and entering the generated route pattern into the live dial database based on the route filter.

10. The method of claim 9, wherein the route filter specifies valid route patterns tags associated with each route pattern.

11. The method of claim 7, wherein the configured routing data further comprise digit discard instructions, the digit discard instructions specifying digits to retain when routing calls placed by users, the digits specified using tags associated with the configured route pattern.

12. The method of claim 7, wherein the configured routing data further comprise digit transformation instructions, the digit transformation instructions specifying a modification to perform on matched digits, the matched digits and the modification to perform specified tags associated with the configured route pattern.

13. Logic for telephony call management, the logic encoded in non-transitory computer-readable media and operable when executed to:
maintain dial plan data comprising a plurality of route pattern definitions;
maintain configured routing data comprising a configured route pattern including an expansion indicator;
access the configured routing data to read the configured route pattern;
identify the expansion indicator in the configured route pattern;
access the dial plan data responsive to identifying the expansion indicator; and
while accessing the dial plan data, for each of the route pattern definitions in the dial plan data:
generate a route pattern based on the route pattern definition; and
enter the generated route pattern into a live dial database for use in routing calls placed by users.

14. The logic of claim 13, wherein:
the dial plan data implements the North American Numbering Plan; and
the live dial database specifies routing of telephone calls from managed voice over Internet protocol (VoIP) devices.

15. The logic of claim 13, wherein:
the configured routing data further comprise a route filter; and
the logic is further operable, for each of the route pattern definitions in the dial plan data, to generate the route pattern and to enter the generated route pattern into the live dial database based on the route filter.

16. The logic of claim 15, wherein the route filter specifies valid route patterns using tags associated with each route pattern.

17. The logic of claim 13, wherein the configured routing data further comprise digit discard instructions, the digit discard instruction specifying digits to retain when routing calls placed by users, the digits specified using tags associated with each route pattern.

18. The logic of claim 13, wherein the configured routing data further comprise digit transformation instructions, the digit transformation instructions specifying a modification to perform on matched digits, the matched digits and the modification to perform specified tags associated with the configured route pattern.

19. A telephony call management apparatus comprising:
   means for maintaining dial plan data comprising a plurality of route pattern definitions;
   means for maintaining configured routing data comprising a configured route pattern including an expansion indicator;
   means for accessing the configured routing data to read the configured route pattern;
   means for identifying the expansion indicator in the configured route pattern; and
   means for accessing the dial plan data responsive to identifying the expansion indicator and, for each of the route pattern definitions in the dial plan data:
      generating a route pattern based on the route pattern definition; and
      entering the generated route pattern into a live dial database for use in routing calls placed by users.

20. The telephony call management apparatus of claim 19, wherein the configured routing data further comprise a route filter, the telephony call management apparatus further comprising means, for each of the route pattern definitions in the dial plan data, for generating the route pattern and entering the generated route pattern into the live dial database based on the route filter.

21. The telephony call management apparatus of claim 19, wherein the configured routing data further comprise digit discard instructions, the digit discard instructions specifying digits to retain when routing calls placed by users, the digits specified using the tags associated with the configured route pattern.

* * * * *